United States Patent [19]

Jones

[11] 3,826,446

[45] July 30, 1974

[54] PNEUMATIC TAPE REWIND SYSTEM

[75] Inventor: Hale M. Jones, Playa del Rey, Calif.

[73] Assignee: Ampex Corporation, Redwood City, Calif.

[22] Filed: Feb. 14, 1972

[21] Appl. No.: 225,866

[52] U.S. Cl. .............................................. 242/185
[51] Int. Cl. .............................................. G11b 15/58
[58] Field of Search ........... 242/182, 183, 184, 185; 226/95, 97, 118

[56] References Cited

UNITED STATES PATENTS

| | | | |
|---|---|---|---|
| 3,199,800 | 8/1965 | Reader | 226/118 X |
| 3,284,013 | 11/1966 | Naiman et al. | 242/184 |
| 3,329,364 | 7/1967 | Brettell | 242/184 |
| 3,499,614 | 3/1970 | Badum | 226/118 X |
| 3,713,606 | 1/1973 | Van Pelt et al. | 242/186 X |

FOREIGN PATENTS OR APPLICATIONS

| | | | |
|---|---|---|---|
| 975,723 | 11/1964 | Great Britain | 226/118 |

*Primary Examiner*—George F. Mautz

[57] ABSTRACT

A magnetic tape transport system is provided in which a capstan used to drive the tape bidirectionally and intermittently during normal operation is coupled to a pressure source so as to disengage from and act as an air bearing with respect to the tape during rewind, permitting the tape to be driven by differences in tension on loops of the tape within a pair of vacuum chambers. The tension differential is produced by an arrangement of valves and conduits which partially vent the interior of the upstream vacuum chamber to atmosphere to maintain the tape loop therein at a nominal short loop position and which vent the interior of the downstream vacuum chamber to atmosphere only when the loop therein becomes too long so as to maintain the loop at an optimum long loop position. Thus capstan drive is eliminated during rewind with system performance being slaved to the performance of the reel motor-servo combinations which function to maintain the tape loops at the nominal positions within the vacuum chambers. During normal operation the venting conduits within the vacuum chambers are blocked by valves to restore normal vacuum tension within the chambers compatible with capstan drive.

7 Claims, 1 Drawing Figure

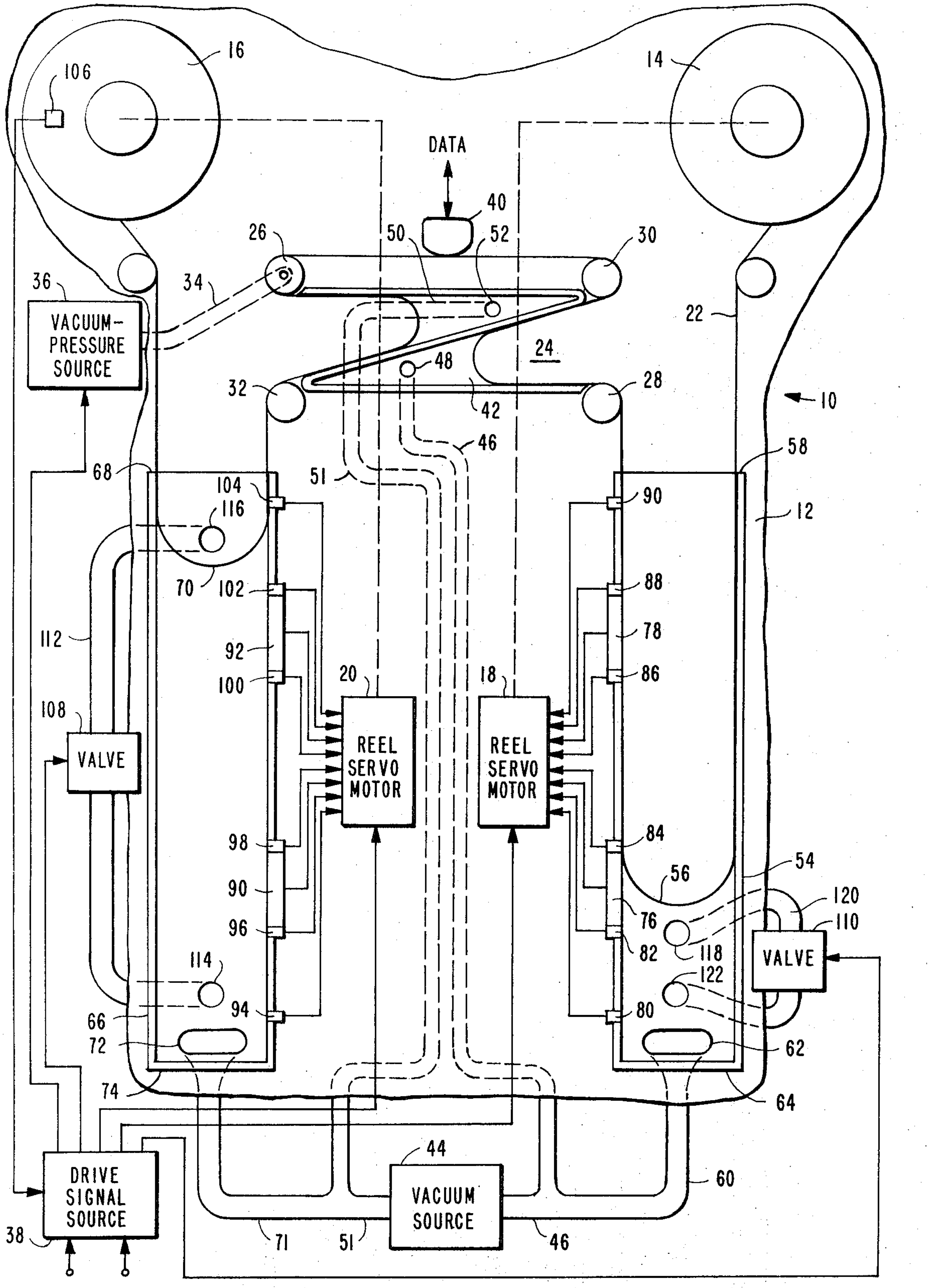
DATA
VACUUM-PRESSURE SOURCE
REEL SERVO MOTOR
REEL SERVO MOTOR
VALVE
VALVE
DRIVE SIGNAL SOURCE
VACUUM SOURCE

PNEUMATIC TAPE REWIND SYSTEM

BACKGROUND OF THE INVENTION

1. Field of the Invention

The present invention relates to magnetic tape transports, and more particularly to transports of the type designed for high speed, bidirectional, intermittent operation such as in data processing applications.

2. History of the Prior Art

With the increasing use of magnetic tape as a means of data storage in data processing operations, ever greater demands have been placed on the magnetic tape equipment as computational speeds and the speeds at which data may otherwise be processed continue to increase. It is not uncommon, for example, for tape transports of the data processing type to operate at speeds on the order of several hundred inches per second or greater.

Such performance capabilities have been made possible by improvements in the tape transport itself including single capstan drives, vacuum chambers which form tape buffering loops, and improved reel servo systems which drive the tape reels in such fashion as to maintain desired lengths of the tape loops within the vacuum chambers despite high operational speeds of the tape in the vicinity of the read and write heads. The single capstan drive system with its high torque-to-inertia ratio has enabled the tape to be quickly and efficiently accelerated from rest to nominal operating speed in either direction and then decelerated to rest again upon command. The vacuum chambers which form the tape loop therein by drawing the tape in under reduced pressure serve to greatly enhance the capabilities of the tape transport system by providing a tape buffer which acts to compensate for the excesses of tape in some locations within the transport and scarcity of tape in still other locations of the transport as the reels attempt to keep up with the capstan.

It has been found that during normal operation of the tape transport use of one or more capstans to drive the tape provides for a system in which the tape is driven in a rapid and efficient manner so as to favorably complement the performance capabilities of other components within the overall system. The coupling of a source of vacuum or reduced pressure to the capstan further enhances the frictional contact between the capstan outer surface and the tape so as to drive the tape in positive fashion. However where substantial amounts of the tape are to be rewound from one reel to the other, the rewind operation is necessarily limited by the capabilities of the capstan-motor combination. As a result much useful time is wasted since the reel servo-motor combinations in such systems are typically capable of operating at much faster speeds. Such waste of time results in system inefficiency, and entire computational operations may be held up awaiting rewind of the tape.

Attempts have been made to completely eliminate capstan control of the tape in an effort to improve overall system performance. However the resulting arrangements typically solve certain of these problems only at the expense of certain other problems or inherent limitations. One example of a tape transport system which uses a pneumatic driving principle so as to completely eliminate capstan control of the tape is disclosed in U.S. Pat. No. 3,329,364 of G. A. Brettell, issued July 4, 1967 and assigned to the same assignee as this application. In the Brettell arrangements the tape is driven as a result of differences in the tensions on the tape loops in opposite vacuum chambers. The tension differential results from a difference in the pressures within the vacuum chambers as determined by a rather complex servo system. Such servo system varies the pressure in the chambers in substantially analog fashion so as to vary the tension on loops of substantially equal length and thereby produce desired speeds of tape drive. Such a system accomplishes certain advantages at the expense of certain other advantages which are derived from capstan control of the tape during normal operation and in view of the requirement that a relatively complex servo system be employed to effect actual variations in the reduced pressure as it is communicated to the various different vacuum chambers.

Ideally, a magnetic tape transport system of the type used for high speed, bidirectional, intermittent operation should be capable of employing capstan drive of the tape to advantage without the usual accompanying limitations of reduced speed and inefficiency of performance such as during rewind operations. At the same time the system should be capable of employing capstan-free operation to advantage without attendant disadvantages such as a requirement for complex servo systems.

SUMMARY OF THE INVENTION

The present invention advantageously combines the advantages of capstan drive of the tape during normal operation with the advantages of capstan-free drive during rewind. During normal operation the tape transport operates in conventional fashion by employing one or more capstans to engage and drive the tape in bidirectional, intermittent fashion. A pair of vacuum chambers disposed between the capstan and the reels provide buffering tape loops which are maintained at nominal lengths within the vacuum chambers by reel servo systems having sensors located along the lengths of the vacuum chambers and responsive to the positions of the tape loops to drive the associated reels accordingly. During rewind the capstan or capstans are disengaged from the tape so as to permit the tape to move freely between the vacuum chambers as a result of differences in tension exerted on the tape loops within the two different vacuum chambers. The tension differential is accomplished by providing different levels of reduced pressure within the vacuum chambers using a system of conduits and valves associated with the vacuum chambers. The system is thus slaved to the optimum performance of the reel servomotor combinations rather than to the capstan during rewind, providing rewind speeds which are several orders of magnitude greater than the normal operating speeds of the transport.

In one preferred embodiment of a tape transport system incorporating a pneumatic rewind system in accordance with the invention a single capstan located at an intermediate region between opposite tape reels is coupled to a vacuum source so as to maintain the tape in frictional engagement therewith during normal operation. The capstan drives the tape past a magnetic read-write head in the intermediate region between the opposite reels and associated vacuum chambers which form buffering loops in the tape. Reel servo systems associated with the reels employ light sensors located along the lengths of the vacuum chambers to provide indications of tape loop position. The servos operate the associated reels so as to respectively maintain the two different tape loops at optimum long and short loop positions dependent upon the direction of tape drive.

Upon commencement of rewind the capstan is uncoupled from the vacuum source and is instead coupled to a pressure source which provides for disengagement of the tape therefrom and enables the capstan to act as an air bearing. The tape is accordingly free to move between the vacuum chambers in response to differences in tape tension within the vacuum chambers as provided by arrangements of valves and conduits.

The vacuum chamber at the downstream side of the capstan includes a conduit which couples the interior thereof to a port or aperture in the wall of the chamber adjacent to and on the opposite side of an optimum long loop position from the open end of the chamber. Accordingly the full force of the vacuum communicated to the interior of the downstream chamber is applied to the tape so long as the tape loop remains at or above the optimum long loop position. In the event the associated reel is unable to wind the tape at a sufficient rapid rate, the length of the loop within the downstream chamber lengthens to such an extent that the loop drops below the port or aperture, thereby partially venting the interior of the downstream vacuum chamber to the outside atmosphere and reducing the tension on the tape loop. The reduction in tape tension within the downstream vacuum chamber relative to the tension exerted on the tape loop within the upstream chamber slows movement of tape from the upstream to the downstream chambers enabling the downstream reel to catch up with the tape movement.

The upstream vacuum chamber includes a conduit which couples the interior thereof to a port or aperture in the wall of the chamber adjacent to and on the same side of an optimum short loop position as the open end of the chamber. The resultant venting action reduces the vacuum within the upstream chamber to that of a partial vacuum so as to provide a reduced tension on the tape loop therein relative to the tension on the tape loop in the downstream chamber so long as the tape loop remains at or below the short loop position as defined by the port or aperture. In the event the associated reel cannot feed the tape fast enough to maintain the optimum short loop condition, the resulting shortening of the tape loop within the upstream chamber raises the loop up to the aperture or port so as to terminate the vented condition within the upstream chamber and apply the full force of the vacuum within the chamber to the tape loop. The resulting increase in the tension on the tape loop within the upstream chamber relative to the loop tension in the downstream chamber acts to slow down the movement of tape from the upstream chamber to the downstream chamber and thereby allow the reel which is supplying the tape to catch up with the system. At the end of rewind valves located within the conduits at both of the vacuum chambers are closed so as to prevent the chambers from being vented and thereby restore the chambers to normal operation in conjunction with the driving of the tape via the capstan.

BRIEF DESCRIPTION OF THE DRAWINGS

The foregoing and other objects, features and advantages of the invention will be apparent from the following more particular description of a preferred embodiment of the invention, as illustrated in the accompanying FIGURE of drawings.

DETAILED DESCRIPTION

The preferred embodiment shown in the single FIGURE of drawings comprises a tape transport 10 having a frame 12 which is partially broken away for convenience of illustration. Mounted on the frame 12 are a file reel 14 and a machine reel 16 which are respectively driven by reel servo-motor combinations 18 and 20. The file reel 14 is so designated since it may comprise that reel which is installed in the tape transport 12 when it is desired to utilize magnetic tape 22 stored thereon. The machine reel 16 is so designated since it may comprise a reel permanently associated with the transport 10 or otherwise installed in the transport 10 so as to store the the tape 22 as it is unwound from the file reel 14.

The magnetic tape 22 extends between the reels 14 and 16 and follows a predetermined path through an intermediate region 24 which includes a capstan 26 and air bearings 28, 30 and 32. The capstan 26 is coupled via a conduit 34 to a vacuum-pressure source 36 which is controlled by a drive signal source 38. During normal operation the vacuum-pressure source 36 responds to appropriate signals from the drive signal source 38 to communicate a vacuum or condition of reduced pressure via the conduit 34 to the capstan 26. The resulting vacuum in the region of the capstan 26 acts to hold the magnetic tape 22 on the outside surface of the capstan in close frictional engagement. A high torque-to-inertia ratio motor (not shown) is coupled to drive the capstan 26 in conventional fashion so as to advance the tape 22 in either direction past a magnetic read-write transducer 40 positioned adjacent the path of the tape 22 between the capstan 26 and the air bearing 30. The portion of the magnetic tape 22 extending between the air bearings 28 and 30 is drawn into a triangular-shaped pocket 42 by a reduced pressure communicated to the pocket 42 from a vacuum source 44 via a conduit 46 and an aperture or port 48. Similarly that portion of the magnetic tape 22 which extends between the capstan 26 and the air bearing 32 is drawn into a triangular-shaped pocket 50 by reduced pressure within a conduit 51 which couples the vacuum source 44 to a port or aperture 52. The resulting tape loops which are formed within the pockets 42 and 50 provide a tape tension on both sides of the capstan 26. This tension which is typically on the order of seven to nine ounces facilitates acceleration of the tape up to the nominal operating speed in either direction.

That portion of the tape 22 which extends between the file reel 14 and the intermediate region 24 is drawn into a vacuum chamber 54 so as to form a loop 56 therein. The tape loop 56 which extends into the chamber 54 through an open end 58 thereof is held within the chamber 54 by tension produced by a vacuum communicated to the chamber 54 from the source 44 via the conduit 46 and an associated conduit 60 having a vent 62 at a closed end 64 of the chamber 54 opposite the open end 58. Similarly that portion of the magnetic tape 22 which extends between the intermediate region 24 and machine reel 16 is drawn into a vacuum chamber 66 through an open end 68 thereof so as to form a loop 70 in the tape under the force of a vacuum which is communicated to the interior of the chamber 66 from the vacuum source 44 via the conduit 51 and an associated conduit 71 having a vent 72 which communicates with the interior of the chamber 66 at a closed end 74 thereof opposite the open end 68. The reel servo-motor combination 18 drives the file reel 14 in accordance with the position of the tape loop 56 within the chamber 54 as determined by a plurality of sensors including linear sensors 76 and 78 and point sensors 80, 82, 84, 86, 88 and 90. The linear sensor 76 is located adjacent the lower closed end 64 of the chamber 54 with the point sensors 82 and 84 being located at the opposite ends of the sensor 76. The point sensor 80 is located at a selected location between the point sensor 82 and the lower closed end 64 of the chamber 54. The linear sensor 78 which has the point sensors 86 and 88 at the opposite ends thereof is mounted adjacent the upper portion of the chamber 54 with the point sensor 90 being located at a select location adjacent the upper open end 58. In similar fashion the reel servo-motor combination 20 controls the machine reel 16 in accordance with the position of the tape loop 70 within the chamber 66 as determined by a pair of linear sensors 90 and 92 and a plurality of point sensors 94, 96, 98, 100, 102 and 104. The point sensor 94 which corresponds to the sensor 80 within the chamber 54 is located adjacent the lower closed end 74. The point sensors 96 and 98 which respectively correspond to the sensors 82 and 84 within the chamber 54 are located at the opposite ends of the linear sensor 90. The point sensors 100 and 102 which respectively correspond to the point sensors 86 and 88 within the vacuum chamber 54 are located at the opposite ends of the upper linear sensor 92, while the point sensor 104 which corresponds to the sensor 90 within the vacuum chamber 54 is positioned at a select location adjacent the upper open end 68 of the vacuum chamber 66.

The particular reel servo systems shown and described of the type disclosed in U.S. Pat. No. 3,604,992, Audeh, assigned to the same assignee as the present application. These particular servo systems are shown and described herein for purposes of illustration only, and it will be appreciated by those skilled in the art that other reel servo systems can be used with the pneumatic rewind systems of the invention.

As described in detail in the previously referred to U.S. Pat. No. 3,604,992 the particular reel servo systems shown function to maintain the tape loops 56 and 70 at optimum long loop and short loop positions or vice versa within the vacuum chambers 54 and 66 depending upon the direction in which the tape 22 is being driven by the capstan 26. For example when the tape 22 is being driven in a direction from left to right as seen in the drawing FIGURE so as to unwind from the machine reel 16 and wind onto the file reel 14, the loop 70 within the lefthand vacuum chamber 66 is maintained at a nominal short loop position while the loop 56 within the righthand vacuum chamber 54 is maintained at a nominal long loop position. The nominal short loop position which is adjacent or in alignment with the point sensor 102 in the lefthand vacuum chamber 66 causes the reel servo-motor combination 20 to drive the reel 16 so that the tape loop 70 tends to stabilize at this position. If the loop 70 moves downwardly along the length of the linear sensor 92 the reel servo-motor combination 20 responds by slowing down the reel 16 so as to move the loop 70 back up to the optimum position. Should the loop 70 drop below the point sensor 100 at the lower end of the linear sensor 92, braking is applied to the reel 16. On the other hand if the loop 70 should rise within the vacuum chamber 66 above the level of the point sensor 102, the reel 16 is accelerated to bring the loop 70 down. If a malfunction of the system allows the loop 70 to rise above the sensor 104 the reel servo-motor combination 20 responds by shutting down the transport 10 until the problem can be remedied. The righthand reel servo-motor combination 18 functions so as to stabilize the tape loop 56 at the optimum long loop position adjacent the point sensor 82. If the reel 14 is moving too fast so as to cause the loop 56 to shorten and thereby move up the vacuum chamber 54, the various sensors respond to restore the loop 56 to the optimum position. Thus the positioning of the loop 56 along the length of the linear sensor 76 causes the reel 14 to slow down. If the loop 56 moves above the point sensor 84 braking is applied to the reel 14. On the other hand should the the loop 56 drop below the point sensor 82, the reel 14 is accelerated to bring the loop 56 up. If a malfunction of the system allows the loop 56 to drop below the sensor 80, the reel servo-motor combination 18 responds by shutting down the transport 10.

When the tape 22 is being driven in the opposite direction or from right to left such that the tape unwinds from the file reel 14 and winds onto the machine reel 16, the reel servo systems operate in reverse fashion so as to maintain the tape loop 56 within the righthand vacuum chamber 54 at an optimum short loop position adjacent the point sensor 88 and to maintain the tape loop 70 within the lefthand vacuum chamber 66 at an optimum long loop position adjacent the point sensor 96.

Systems of the type described thus far are capable of advancing the tape 22 past the transducer 40 in bidirectional, intermittant fashion at nominal speeds on the order of two hundred inches per second or greater. The capstan 26 and its associated drive motor are capable of accelerating and decelerating the tape in a sufficiently rapid and efficient manner so as to drive the tape at such speeds. However as previously noted such systems are not being operated at their full capacity during a rewind operation when a substantial pack of tape on the machine reel 16 is to be wound back onto the file reel 14 because of the inherent limitations in the capstan 26 as a driving means for the tape. During rewind the reel servo-motor combinations 18 and 20 are typically capable of operating at much faster speeds while at the same time maintaining the tape loops 56 and 70 at the desired optimum positions within the vacuum chambers 54 and 66.

In accordance with the invention operation of the transport 10 during rewind is slaved to the performance of the reel servo-motor combinations 18 and 20 by disengaging the capstan 26 from the tape 22 and thereafter driving the tape between the vacuum chambers 66 and 54 using variations in the tension on the tape loops within the vacuum chambers. As shown in the drawings, rewind typically occurs at the end of a given data processing operation when it is desired to wind that part of the tape 22 which is stored on the machine reel 16 back onto the file reel 14 as quickly as possible. In most instances there is sufficient tape pack on the machine reel 16 to warrant rewind at a speed much higher than that of normal operation. In a few instances where the tape pack on the machine reel 16 is relatively small so as to obviate the usefulness of a high speed rewind, the tape is driven onto the file reel 14 under normal capstan control.

Upon initiation of the rewind mode of operation, such as by operator actuation of a "rewind" button at a control panel, the drive signal source 38 insures that the system begins driving in the reverse direction or from left to right under normal capstan control and with the reel servo-motor combinations 18 and 20 respectively establishing the long and short loop conditions. A tape pack sensor 106 determines whether the machine reel 16 has more than a selected minimum of tape pack therein, such as 150 feet for example. If the tape pack is less than 150 feet the system continues to run in normal reverse under capstan control until all of the tape is wound onto the file reel 14. If the tape pack on the machine reel 16 is greater than the selected minimum amount as determined by the sensor 106 the drive signal source 38 responds by terminating the vacuum to the capstan 26 via the vacuum-pressure source 36 and by opening a pair of valves 108 and 110. Thereafter the vacuum-pressure source 36 begins to supply pressure to the capstan 26 so as to force air out through the capstan 26 and cause it to function as a low friction air bearing in the same fashion as the bearings 28, 30 and 32. In this state the tape 22 may move freely between the vacuum chambers 66 and 54 without interference by the capstan 26. By creating a tension on the tape loop 56 within the downstream vacuum chamber 54 which is greater than the tension exerted on the loop 70 within the upstream chamber 66 the tape is capable of moving between the chamber 66 and the chamber 54 at a speed which is dependent only upon the ability of the reel servo-motor combinations 18 and 20 to drive the reels 14 and 16 so as to maintain the tape loops 56 and 70 at the optimum positions. The tension differential may be produced by providing a pressure differential between the vacuum chambers 54 and 66.

In the particular embodiment shown the tape loop 70 is subjected to a reduced vacuum and thereby to a reduced tension relative to the tension within the vacuum chamber 54 by partially venting the interior of the chamber 66 to the outside atmosphere whenever the tape loop 70 is at the nominal short loop position. At the same time the normal level of vacuum and thus the tension on the loop 56 within the vacuum chamber 54 is maintained so long as the loop 56 remains at the nominal long loop position within the chamber 54. The partial venting of the lefthand vacuum chamber 66 is accomplished by a conduit 112 which has the valve 108 serially coupled therein. During normal operation in which the tape 22 is being driven by the capstan 26, the drive signal source 38 maintains the valve 108 in a closed position such that the conduit 112 has no effect on the operation of the vacuum chamber 66. During rewind, however, the drive signal source 38 opens the valve 108 allowing one end of the conduit 112 which is coupled via an aperture or port 114 to the interior of the chamber 66 adjacent the lower closed end 74 and the vacuum vent 72 to communicate with the other end thereof at an aperture or port 116 in the sidewall of the vacuum chamber 66 adjacent to and on the same side of the optimum short loop position as the upper open end 68. With the tape loop 70 residing below the port 116 the interior of the vacuum chamber 66 communicates with the port 116 so as to be vented to the outside or to atmosphere. This reduces the level of vacuum within the chamber 66. The resulting tension on the tape loop 70 is thereby less than the tension on the tape loop 56 within the righthand vacuum chamber 54, causing the tape to move out of the lefthand vacuum chamber 66, through the intermediate region 24 and into the righthand vacuum chamber 54 at a rate substantially determined by the tension differential. At the same time the reel servo-motor combinations 18 and 20 operate the associated reels 14 and 16 to maintain the loops 56 and 70 at the nominal long and short loop positions respectively. Thus if the loop 56 begins to shorten so as to move upwardly along the length of the linear sensor 76, the reel servo-motor combination 18 responds by slowing down the reel 14 as previously described. During the rewind operation the reel 16 may not be able to supply tape fast enough to maintain the tape loop 70 at the optimum short loop position. This condition may be produced by a number of factors such as the inability of the reel 16 to turn fast enough when the tape pack thereon is considerably less than that on the file reel 14. When this condition occurs the tape loop 70 rises to the port 116 so as to partly or completely enclose the port 116 and thereby terminate the partial venting of the interior of the lefthand vacuum chamber 66. The resulting increase in the vacuum level within the chamber 66 increases the tension on the tape loop 70 relative to the tension on the tape loop 56 within the righthand vacuum chamber 54 so as to slow the movement of tape from the chamber 66 into the chamber 54 and thereby allow the reel 16 to catch up.

As previously noted the tape loop 56 within righthand vacuum chamber 54 ideally stabilizes at the optimum long loop position during rewind. Certain conditions however may result in the lengthening of the tape loop 56. Such condition may be brought about by the inability of the reel 14 to turn fast enough to wind tape thereon such as where the tape pack on the reel 14 is relatively small compared to the tape pack on the reel 16. When this condition occurs the tape loop 56 moves downwardly within the vacuum chamber 54 so as to expose an aperture or port 118 to the outside atmosphere. The port 118 within the wall of the chamber 54 comprises one end of a conduit 120 which has the valve 110 serially coupled therein and which has its opposite end coupled to an aperture or port 122 within the wall of the vacuum chamber 54. The port 122 corresponds to the port 114 within the vacuum chamber 66 in that it enables the interior of the vacuum chamber 54 to communicate with the other end of the conduit 120 via the valve 110 which is opened by the drive signal source 38 during rewind. However while the port 116 within the lefthand vacuum chamber 66 is located on the same side of the optimum short loop position as is the open end 68, the upper port 118 within the righthand vacuum chamber 54 is located adjacent to but on the opposite side of the optimum long loop position from the upper open end 58. Thus full vacuum and the accompanying high level of tension are applied to the loop 56 so long as the loop remains at or above the optimum long loop position. However when the reel 14 is unable to take up the tape at a fast enough rate so that the loop 56 moves down to expose part or all of the port 118 to the outside atmosphere via the open end 58, the level of vacuum and thereby the tension on the tape loop 56 are reduced. This slows the movement of tape from the lefthand vacuum chamber 66 into the righthand vacuum chamber 54 enabling the reel 14 to catch up.

The system continues to rewind pneumatically at high speed until the sensor 106 determines that only the minimum amount of tape pack remains on the machine reel 106. The drive signal source 38 responds by causing the reel servo-motor combinations 18 and 20 to begin deceleration of the reel motors. When the reel motors are decelerated to a tape speed approaching the optimum normal tape speed, the valves 108 and 110 are closed and vacuum is again applied to the capstan 26 to restore normal operation in the direction from left to right. Thereafter the tape is decelerated to rest.

The tape loops within the pockets 42 and 50 are maintained at nominal positions during rewind despite changes in the tension on the tape loops 56 and 70 within the vacuum chambers 54 and 66 by the conduits 46 and 51 which are respectively coupled to the conduits 60 and 71 so as to communicate to the ports 48 and 52 essentially the same pressure as exists within the associated vacuum chambers. Thus a reduction in the pressure within the vacuum chamber 66 and thereby the tension on the tape loop 70 is communicated via the conduits 71 and 51 to the port 52 to produce a corresponding reduction in the tension on the tape loop within the pocket 50 and thereby maintain the loop at its nominal position. The conduits 46 and 60 function in similar fashion to vary the tension on the tape loop within the pocket 42 as a direct function of the tension on the tape loop 56.

It will be appreciated that pneumatic rewind systems in accordance with the invention make possible the rewinding of tape at very high speeds by making the rewind speed dependent on the capability of the reel servo-motor combinations and not the capstan. The system is self-adjusting in the sense that it always chooses a speed which is only as fast as both reel servo-motor combinations can tolerate. Accordingly the greatest rewind speed is typically achieved when the reels 14 and 16 have substantially equal amounts of tape pack thereon. At other times the reel with the lesser amount of tape pack is normally required to operate at a higher speed than the other reel and will cause the pressure within the associated vacuum chamber to change by way of compensation in the event the associated reel servo-motor combination is incapable of maintaining the tape loop at the optimum position. The valves 108 and 110 are closed each time normal operation is to be restored and the pneumatic rewind system accordingly has no affect on the reel servo-motor combinations 18 and 20 or other parts of the tape transport 10 during normal operation. The amount of vacuum variation which occurs within the vacuum chambers 66 and 54 as a result of the conduits 112 and 120 may be adjusted such as by varying the size of the ports 114 and 122 and their locations relative to the vacuum vents 72 and 62.

It has been found that pneumatic rewind systems in accordance with the invention when incorporated as a part of tape transports of the type which operate at speeds on the order of several hundred inches per second are capable of rewinding at speeds in excess of 1,000 inches per second.

While the invention has been particularly shown and described with reference to a preferred embodiment thereof, it will be understood by those skilled in the art that various changes in form and details may be made therein without departing from the spirit and scope of the invention.

What is claimed is:

1. A system for driving an elongated web material through an intermediate region between two storage reels, comprising:

at least a pair of pneumatic buffer means for forming low inertia loops in the web material in the interior of the buffer means on opposite sides of the intermediate region;

means defining a low friction path for the elongated web material between the buffer means and through the intermediate region, the low friction path allowing the web material to move freely between the buffer means;

means responsive to the loop lengths in the buffer means for operating the storage reels to tend to maintain nominal loop lengths therein;

means coupled to a closed end of each of the pair of buffer means for providing a reduced pressure at the interior of the buffer means;

means associated with one of the buffer means for maintaining the loop of web material adjacent a selected location therein by venting the interior of the buffer means to the exterior thereof except when the loop of web material becomes displaced from the selected location, said means including means coupling the interior thereof at a first opening adjacent the closed end to the interior thereof at a second opening at a location adjacent and on the opposite side of the selected loop location from the closed end, the second opening being a substantial distance from the first opening; and means associated with the other one of the buffer means for maintaining the loop of web material adjacent a selected location therein by venting the interior of the buffer means to the exterior thereof whenever the loop of web material becomes displaced from the selected location, said means including means coupling the interior thereof at a third opening adjacent the closed end to the interior thereof at a fourth opening at a location adjacent and on the same side of the selected loop location as the closed end, the third and fourth openings being completely separated from one another.

2. A system in accordance with claim 1, wherein the means coupling the first opening to the second opening comprises a first conduit including means therein for selectively opening and closing the first conduit, and the means coupling the third opening to the fourth opening comprises a second conduit including means therein for selectively opening and closing the second conduit.

3. A system in accordance with claim 2, wherein the selected loop location within said one of the buffer means is at a selected distance from the closed end thereof to define a short loop and the selected loop location within said other one of the buffer means is at a distance substantially less than said selected distance from the closed end thereof to define a long loop.

4. A system for driving an elongated web material through an intermediate region between two storage reels, comprising:

a pair of pneumatic buffer means for forming low inertia loops in the web material on opposite sides of the intermediate region in response to a vacuum condition therein;

means responsive to the loop lengths in the buffer means for operating the storage reels to tend to maintain nominal loop lengths therein;

means within the intermediate region for selective engagement with the web material to drive the web material during a first mode of operation, said driving means being disengaged from the web material during a second mode of operation;

means coupled to one of the buffer means for increasing the vacuum condition therein whenever the loop of the web material therein becomes shorther than the nominal length during the second mode of operation, said means comprising means coupling different portions of the interior of the buffer means together and valve means for controlling pressure communication therebetween, the valve means preventing pressure communication during the first mode of operation and permitting pressure communication during the second mode of operation; and means coupled to the other one of the buffer means for decreasing the vacuum condition therein whenever the loop of the web material therein becomes longer than the nominal length during the second mode of operation, said means comprising means coupling different portions of the interior of the buffer means together and valve means for controlling pressure communication therebetween, the valve means preventing pressure communication during the first mode of operation and permitting pressure communication during the second mode of operation.

5. A magnetic tape transport system comprising:

first and second tape reels for storing a length of magnetic tape therebetween;

transducer means disposed adjacent a path for the magnetic tape at a region intermediate the first and second reels;

first and second vacuum chambers disposed on opposite sides of the intermediate region and adjacent the first and second reels respectively for imposing vacuum tension on the tape to form loops therein;

first and second reel servos for respectively driving the first and second tape reels so as to maintain loops of selected nominal sizes in the first and second vacuum chambers;

at least one capstan within the intermediate region for engaging the tape to drive the tape past the transducer means during normal operation, the capstan being disengaged from the tape and acting as a low friction bearing during rewind of the tape;

means coupling the capstan to a vacuum source to enhance engagement with the tape during normal operation and to a pressure source to enhance disengagement from the tape during rewind;

means for maintaining the loop within the first vacuum chamber at a nominal short loop size during rewind of the tape including means for increasing vacuum tension on the loop whenever the size thereof becomes smaller than the nominal short loop size; and means for maintaining the loop within the second vacuum chamber at a nominal long loop size during rewind of the tape including means for decreasing vacuum tension on the loop whenever the size thereof becomes larger than the nominal short loop size.

6. A system in accordance with claim 5, wherein the vacuum tension on the tape is produced by a vacuum source coupled to closed ends of the first and second vacuum chambers, the means for increasing vacuum tension on the loop whenever the size thereof becomes smaller than the nominal short loop size comprises means coupling a first opening in·the first vacuum chamber on the opposite side of a nominal short loop position from the closed end of the first vacuum chamber to the interior of the first vacuum chamber adjacent the closed end thereof, and the means for decreasing vacuum tension on the loop whenever the size thereof becomes larger than the nominal long loop size comprises means coupling a second opening in the second vacuum chamber on the same side of a nominal long loop position from the closed end of the second vacuum chamber to the interior of the second vacuum chamber adjacent the closed end thereof.

7. In a magnetic tape transport system in which tape is intermittently and bidirectionally driven at a nominal speed past transducer means during normal operation, said tape extending between opposite storage reels and associated vacuum chambers which combine with reel servos to form loops of nominal length in the tape, an arrangement for rewinding the tape at a speed greater than the nominal speed comprising means associated with one of the vacuum chambers for coupling the interior thereof to an aperture located at given distance from an open end thereof to define a nominal short loop position and means associated with the other one of the vacuum chambers for coupling the interior thereof to an aperture located at a distance greater than said given distance from an open end thereof to define a nominal long loop position, each of said coupling means comprising a conduit extending between said aperture and another aperture in a wall of the associated vacuum chamber adjacent a source of reduced pressure for the vacuum chamber, and valve means located within each conduit for closing the interior of the conduit during normal operation and for opening the interior of the conduit during rewinding of the tape.

* * * * *